April 18, 1933.  I. SAKS  1,904,953

CLUTCH OR TRANSMISSION PLATE

Filed Aug. 18, 1931

INVENTOR.
Ira Saks

BY

Fay Oberlin & Fay
ATTORNEYS.

Patented Apr. 18, 1933

1,904,953

UNITED STATES PATENT OFFICE

IRA SAKS, OF CLEVELAND, OHIO

CLUTCH OR TRANSMISSION PLATE

Application filed August 18, 1931. Serial No. 557,786.

The present invention relating as indicated to a clutch plate, has more particular reference to that type of friction member which is employed in the assembly of a so-called "dry plate" clutch construction, as utilized in present day automotive practice. It is the function of the clutch plate or driven plate to be frictionally engaged between two aligned rotating members, usually the flywheel and pressure plate, and to intermittently transmit torque therebetween.

The fundamental object to be achieved by such a clutch or transmission plate is to so engage with its related rotational parts as to prevent a grabbing or uneven action. When such grabbing action occurs, the torque is so suddenly transmitted to the moving parts that there occurs the danger of excessive strain and premature failure of said parts.

It is a further object to so construct the clutch plate in order to eliminate any weak spots at points which are subjected to maximum alternate stresses and hence to render the device less susceptible to fatigue failure. Another object of the present invention is to provide a simplified means of riveting the friction facing rings to the clutch discs. Objects and advantages additional to those above enumerated shall become manifest during the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
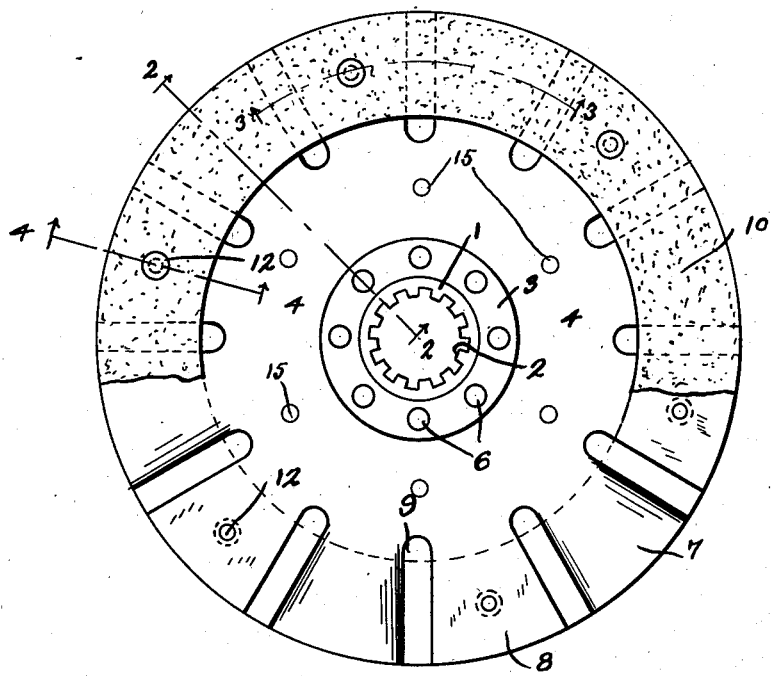
Figure 2:
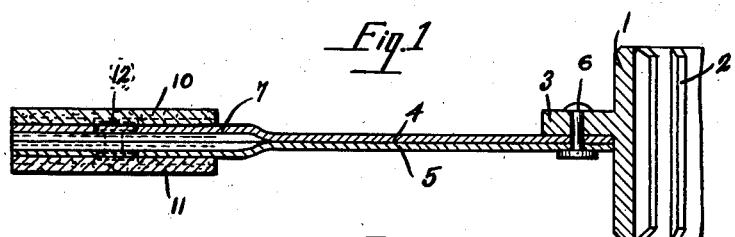
Figure 4:
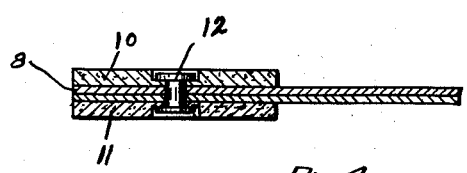
Figure 5:
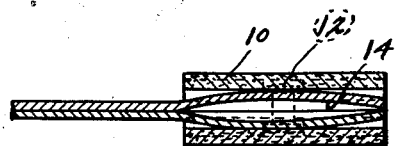
Figure 3:
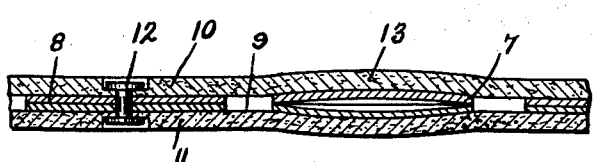

In said annexed drawing:

Fig. 1 is an elevational view with a part of the facing ring removed of the clutch plate embodying the principle of my invention; Fig. 2 is a section taken substantially upon the radius 2—2 of Fig. 1; Fig. 3 is a fragmentary section taken substantially upon the arcuate line 3—3 of Fig. 1; Fig. 4 is a fragmentary section taken substantially upon the radial line 4—4 of Fig. 1; Fig. 5 is a fragmentary radial section similar to Fig. 2, illustrating an alternative form of disc sector construction.

Referring more particularly to the drawing, the clutch plate consists of the hub 1 and spline 2 for engagement with the driven shaft of a clutch assembly. A flange 3 extending from the central portion of the hub 1 has secured thereto a pair of metallic discs 4 and 5 by means of suitable bolts or rivets or welds at the points 6. The discs 4 and 5 have their outer peripheries in the form of a plurality of alternate bowed and flat sectors 7 and 8, respectively. The sectors 7 and 8 are spaced from each other by the radially extending slots 9. The clutch facing rings 10 and 11 which are composed of suitable fibre or other friction material, are secured to the discs 4 and 5 by means of rivets 12 which extend completely through the flat sectors 8. Each rivet 12, as best illustrated in Fig. 4, serves to join both of the facing rings 10 and 11 and to likewise secure the discs 4 and 5.

Since the bowed sectors 7 are placed alternately between the flat sectors 8, there will occur a series of high spots indicated generally by the numeral 13 in Fig. 3 around the engaging surface of the friction rings 10 and 11. The presence of such high spots 13 are for the purpose of imparting to the clutch plate a cushioning effect upon initial engagement thereof. In other words, the frictional engagement of the clutch plate will occur initially upon the high spots and finally throughout the entire frictional surface of the facing rings upon complete engagement.

As shown in Fig. 5, the bowed sectors 8 may be radially instead of arcuately curved, as indicated by the numeral 14, in order to achieve the above described cushioning effect.

It will thus be seen that by means of riveting the flat sectors by means of the rivets 12 along the outer circumference of the discs 4 and 5, that a more solid jointure of the discs is obtained. Furthermore, such an expedient has the effect of holding the bowed sectors 7 or cushioning elements into certain definite limits, with the result that the plate is less likely to work out of shape or alignment.

It is also possible that in order to more firmly secure together the discs 4 and 5, a series of rivets or spot welds 15 be placed circumferentially around the portion of said discs intermediate the outer sectors and the clutch plate hub. This latter expedient has the further tendency to eliminate vibration and rattle between the two discs, and to correspondingly increase the life of the clutch plate.

A further advantage of the presence of the high spots 13 is found to reside in the fact that the initial wear or "breaking in" of the friction facing rings is greatly facilitated. When the surface of the facing rings is substantially all in one plane, the tendency towards the grabbing action, especially in a new installation, is particularly accentuated. This last noted advantage is considered to be unusually desirable in modern automotive practice.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A clutch plate comprising the combination of a pair of discs each having a series of alternately bowed and flat peripheral sectors, radially extending slots between each of said bowed and flat sectors whereby said sectors are circumferentially isolated from each other, said flat sectors of each disc being in registry with each other, and friction facing rings secured to said flat sectors, said slots extending from the circumference of said discs to a point beyond the inner edge of said facing ring.

2. A clutch plate comprising the combination of a pair of discs each having a series of alternately bowed and flat peripheral sectors, radially extending slots between each of said bowed and flat sectors whereby said sectors are circumferentially isolated from each other, said flat sectors of each disc being in registry with each other, and rivets through said flat sectors adapted to secure friction facing rings on said discs, each of said rivets securing both of said facing rings, said slots extending from the circumference of said discs to a point beyond the inner edge of said facing ring.

3. A clutch plate comprising the combination of a pair of discs each having a series of alternately bowed and flat peripheral sectors, radially extending slots between each of said bowed and flat sectors, whereby said sectors are circumferentially isolated from each other, said flat sectors of each disc being in registry with each other, and friction facing rings secured to said flat sectors, said bowed sectors tending to produce a corresponding series of circumferential bulges in said facing rings.

Signed by me this 10th day of August, 1931.

IRA SAKS.